United States Patent [19]
Pagon et al.

[11] 3,883,835
[45] May 13, 1975

[54] GROUND FAULT SENSOR CURRENT TRANSFORMER

[75] Inventors: John A. Pagon, Clearwater; Spotz Erwin, Largo, both of Fla.

[73] Assignee: Electromagnetic Industries, Inc., Clearwater, Fla.

[22] Filed: July 10, 1974

[21] Appl. No.: 487,362

[52] U.S. Cl. ................. 336/90; 336/176; 336/184; 336/192; 336/212
[51] Int. Cl. ...................... H01f 17/06; H01f 27/02
[58] Field of Search ....... 336/90, 92, 173, 175, 176, 336/212, 216, 217, 192, 180, 184, 210

[56] References Cited
UNITED STATES PATENTS

| | | | |
|---|---|---|---|
| 896,983 | 8/1908 | Frank | 336/217 |
| 1,415,505 | 5/1922 | Angus | 336/175 X |
| 2,148,641 | 2/1939 | Reich | 336/176 X |
| 2,176,756 | 10/1939 | Borden | 336/217 X |

*Primary Examiner*—Thomas J. Kozma
*Attorney, Agent, or Firm*—McGlew and Tuttle

[57] ABSTRACT

The transformer includes a rectangular core of ferromagnetic metal, such as iron, having four legs disengageably interengaged, at the corners of the core, at right angles to each other. Each leg is constituted by several laminae of iron, and the laminae are interleaved at the four corners. The laminations of each leg are secured so that the core will maintain a true rectangular shape. Secondary winding sections are wound on two legs of the core which are parallel to each other, the windings being wound on insulation tubes and preferably being connected in series with each other. Respective outer tubes of dielectric material are telescoped over each leg, so that the winding sections are enclosed. Four split corner brackets of dielectric material, preferably molded, are provided, and each bracket receives and clamps the ends of two outer tubes at a respective corner of the core. The two brackets connecting a third leg of the core to corresponding ends of the two legs carrying the windings are readily removable, together with the tube and the core leg extending therebetween, to provide for installation of the transformer over existing duct work and bus-bars. One of the corner brackets connecting the fourth leg of the core to the two legs carrying the windings is provided with externally accessible terminals connected to the winding sections, whereby the secondary winding of the transformer, constituted by the interconnected winding sections, may be connected to ground current sensor components.

7 Claims, 5 Drawing Figures

PATENTED MAY 13 1975 3,883,835
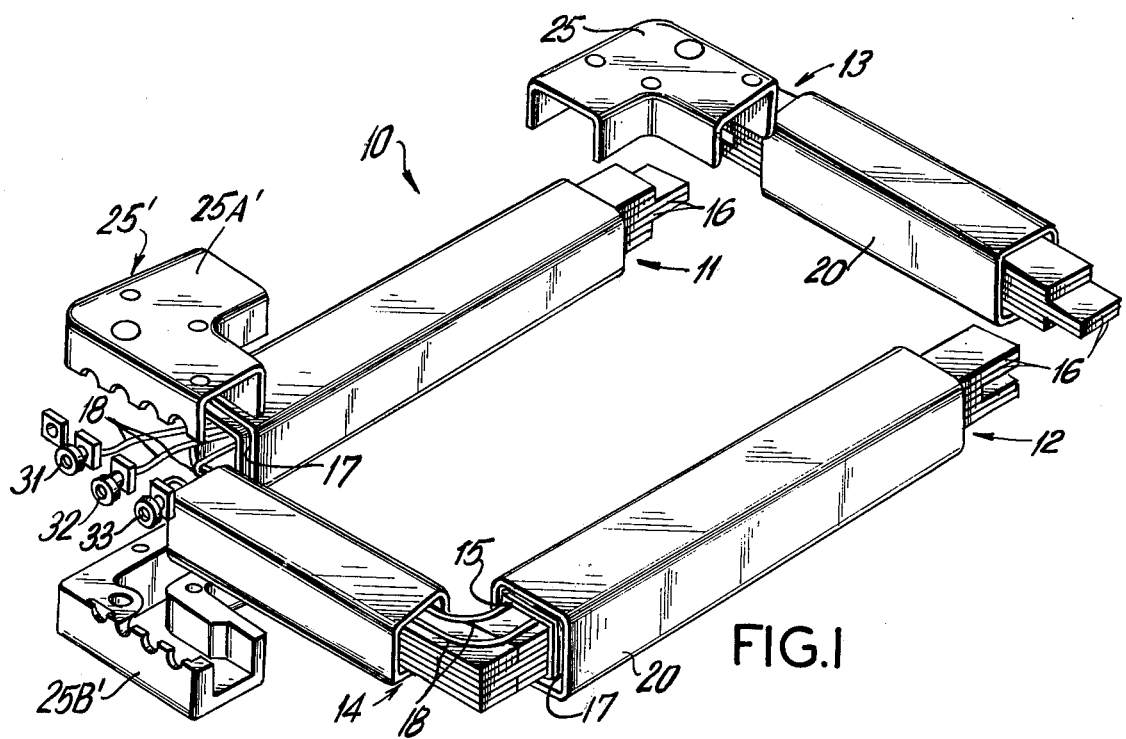
FIG.1
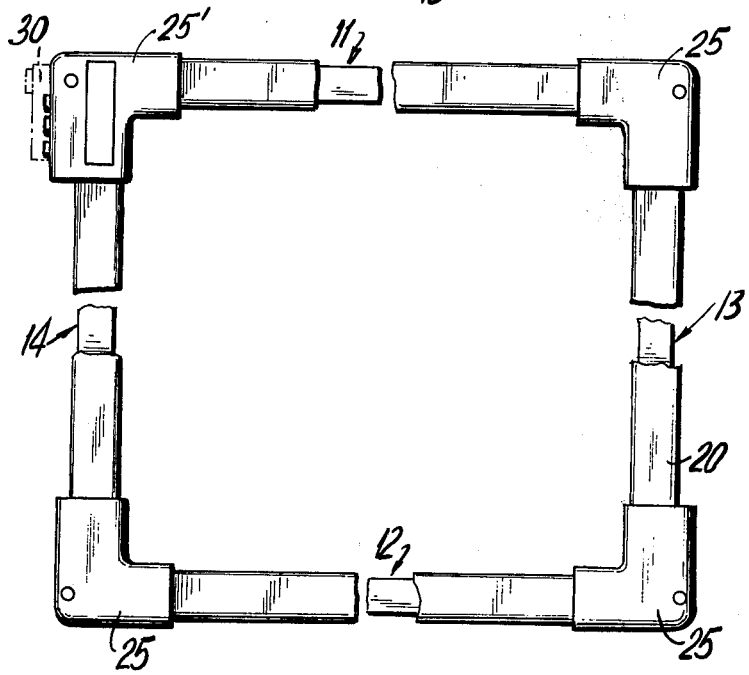
FIG.2
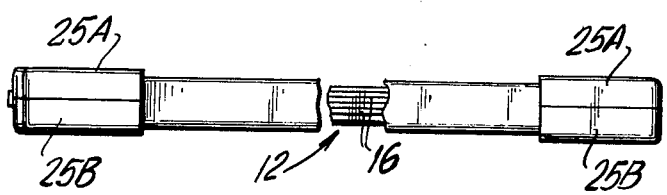
FIG.3
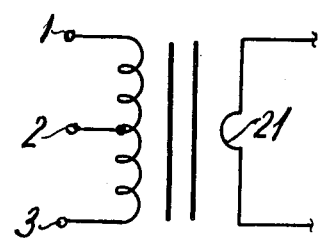
FIG.4
FIG.5

GROUND FAULT SENSOR CURRENT TRANSFORMER

FIELD AND BACKGROUND OF THE INVENTION

This invention relates to current transformers and, more particularly, to a novel and improved current transformer particularly for use with a ground fault current sensor.

Ground fault current sensors are used between a source of electric potential and a load connected to the source, to detect any ground fault current at the load side of a current transformer. Thus, in a ground fault current sensor used with a three-phase supply having a neutral grounded at the source of potential, and in the absence of any fault between the current sensor and the load, the currents flowing in the three phases are balanced and there is no current in the grounded neutral. However, if a ground fault occurs between the current transformer of the ground fault current sensor and the load, there is an imbalance of the currents and this is used to trigger components for interrupting the supply of current to the load or, alternatively, to provide a warning signal.

Such ground fault current sensors generally utilize current transformers embracing all the conductors of a circuit leading to a load. Such a current transformer, when embracing all the conductors leading to a load, provides a single turn primary winding, and a secondary winding, wound on the core of the current transformer, provides an output signal when there is a ground fault between the current transformer and the load. The current transformers used must be designed for mounting over duct work and bus-bars and must be economical, reliable and efficient in construction in order for the ground fault current sensor to operate properly. As hitherto used, such current transformers have generally comprised hingedly interconnected core sections, for mounting of the current transformer over existing duct work and bus-bars. Such hinged constructions have generally not proven to satisfactory in service. For example, such current transformer constructions are not readily adaptible to different cross sections and sizes of duct work and bus-bars.

SUMMARY OF THE INVENTION

In accordance with the present invention, a ground fault current sensor current transformer is provided which is readily installed over existing duct work and bus-bars having a square or rectangular cross section of any size. For this purpose, the current transformer has a rectangular configuration involving four legs, with two opposite and parallel legs having secondary winding sections wound thereon, and a third leg being readily removable to permit installation of the transformer over existing duct work or bus-bars. The fourth leg carries secondary winding terminals which are externally accessible.

More particularly, the current transformer has a rectangular core of ferromagnetic metal, such as iron, with four legs disengageably interengaged, at the corners of the core at right angles to each other. Each leg is formed by several iron laminae, and the laminae are interleaved at the four corners of the core. Two opposite and parallel legs, which are preferably the longer legs in the case of a rectangular configuration as distinguished from a square configuration, are provided with respective secondary winding sections which are wound on insulation tubes and are connected in series with each other. Other tubes of plastic dielectric material are telescoped over each leg, so that the tubes enclose the winding sections. Four split corner brackets molded of dielectric material, such as a glass-filled polyester resin, are provided, and each bracket receives and clamps the ends of two tubes at a respective corner of the core. The two brackets at the ends of the legs having the winding sections wound thereon are readily removable, together with the tube and the third core leg extending therebetween, to provide for installation of the transformer over existing duct work and bus-bars. One bracket engaged with the fourth leg of the core has externally accessible brass terminals which are connected to the secondary winding constituted by the two winding sections.

The use of the enclosing plastic tubes and the corner moldings makes the design capable of use for any size square or rectangular configuration, simply by making the plastic tubes, the core legs and the coils of the requisite dimensions to fit the particular requirements. The result is a compact, inexpensive, and readily adaptible current transformer construction for use with ground fault current sensors.

An object of the invention is to provide an improved current transformer particularly for use with the ground fault current sensor.

Another object of the invention is to provide such a current transformer which has a rectangular shape including four legs, with one leg being removable for ready installation of the transformer over existing duct work and bus-bars.

A further object of the invention is to provide such a transformer which is inexpensive and versatile in construction.

For an understanding of the invention, reference is made to the following description of a typical embodiment thereof as illustrated in the accompanying drawings.

BRIEF DESCRIPTION OF THE DRAWINGS

In the Drawings:

FIG. 1 is a perspective view of a current transformer embodying the invention, with certain parts omitted to clarify the illustration;

FIG. 2 is a plan view of a current transformer embodying the invention;

FIG. 3 is a side elevation view of the current transformer shown in FIG. 2;

FIG. 4 is an end elevation view of the current transformer shown in FIG. 2; and

FIG. 5 is a wiring diagram of a current transformer.

DESCRIPTION OF THE PREFERRED EMBODIMENT

Referring to FIGS. 1, 2, and 3, the current transformer embodying the invention comprises an iron core 10 built up from flat laminations or laminae of ferromagnetic metal, preferably iron. The core includes four legs 11–14, and the laminations are so arranged that they interleaved at the four corners of the core. The laminations 16 of each leg of core 10 are secured so that core 10 will maintain a true rectangular shape which facilitates the removal of one leg when mounting the transformer in its working position on existing ductwork or bus-bars.

Two parallel opposite legs 11 and 12 of core 10 have insulating tubes 15 embracing the laminations 16, and respective winding sections 17 are wound on these insulating tubes. The winding sections consist of many turns of copper magnet wire wound on the respective tubes 15. Electrical insulation and mechanical protection of adequate strength are integrated by vacuum varnish impregnation. For a purpose to be described, each winding section has leads 18 extending therefrom at its end adjacent the fourth leg 14.

Each of the legs 11–14 is encased in a rectangular cross section tube of plastic composition dielectric material 20, the tubes 20 embracing the winding sections 17 and the insulating tubes 15 on the legs 11 and 12 and the leads 18 extending along the leg 14.

Four corner brackets 25, 25' are provided, these brackets being split brackets each including a pair of mating bracket sections 25A, 25B or 25A', 25B'. Each bracket 25, 25' receives and clamps the ends of two outer tubes 20 and the core at a respective corner of the core 10, and it will be noted that the two halves of each bracket are formed with apertures to receive suitable fastening means such as bolts or the like. The three brackets 25 are identical with each other. However, the bracket 25' differs from the three brackets 25 in that it forms a terminal bracket, the terminal bracket 25' having brass terminals 31, 32 and 33 which are externally accessible. The leads 18 extending from the winding section 17 on the leg 12 and along the leg 14 are secured to these terminals as are the leads 18 extending from the winding section 17 on the leg 11, the connections being such that the winding sections 17 are connected in series with each other between the outer terminals 31 and 33. The intermediate terminal 32 is connected to a tap of the winding section 17 for test purposes.

Neither the third leg 13 nor the fourth leg 14 has a winding thereon, although the fourth leg 14 has the leads 18 extending therealong within the associated outer tube 20.

To mount the transformer on existing duct work or bus-bars, the corner brackets 25 at the opposite ends of the leg 13 are removed, to permit disengagement of the leg 13 from the legs 11 and 12, so that the resulting U-shaped structure may be readily mounted over the existing duct work or bus-bars. The corner brackets 25 at the opposite ends of the leg 13 are then reengaged with the tubes 20 on the legs 11 and 12 and clamped against these tubes, thus reconstituting the complete core 10 surrounding the duct work or bus-bars.

This system of plastic dielectric outer tubes 20 and corner moldings 25 and 25' makes the transformer design capable of forming any size square or rectangle, simply by making the plastic tubes, the core and the coils of sufficient dimensions to fit the particular requirements. Consequently, the current transformer of the invention is very versatile in its application, as well as being economical to manufacture and efficient in operation.

While, in the embodiment just described, there is no winding on the leg 14 of the core, if necessary or desirable an additional winding section could be provided on this leg 14 and connected in series with the winding sections 17 on the legs 11 and 12. However, the leg 13 does not have any winding thereon in any event, thus facilitating its ready disengagement from the other three legs for mounting of the transformer on existing duct work or bus-bars.

The corner moldings 25 and 25' preferably are molded from glass-filled polyester resin. Additionally, a terminal cover 30 may be provided for the brass terminals 31, 32 and 33.

FIG. 5 is a wiring diagram illustrating the electrical connections, and, in FIG. 5, a single turn primary winding 21 is constituted by the bus-bars or other current carrying power conductors extending through the core 10. The terminals 1, 2 and 3 correspond to the terminals 31, 32 and 33, and it will be noted that the voltage of the secondary winding, constituted by the series connected winding section 17, is available between the outer terminals 1 and 3. Terminal 2 is a "test input" terminal, with the input being applied between terminal 2 and terminal 3 for test purposes.

While a specific embodiment of the invention has been shown and described in detail to illustrate the application of the principles of the invention, it will be understood that the invention may be embodied otherwise without departing from such principles.

What is claimed is:

1. A current transformer, particularly for use with a ground fault current sensor, comprising, in combination, a rectangular core of ferromagnetic metal, said core having four legs disengageably interengaged, at the corners of the core, at right angles to each other; respective secondary winding sections wound on at least two of said legs and connected to each other and to output terminals; respective tubes of dielectric material telescoped over each leg, said tubes enclosing said winding sections; and four corner brackets of dielectric material each receiving and clamping the ends of two tubes and the core at a respective corner of said core; two of said brackets being readily removable, together with the tube and core leg extending therebetween, to provide for installation of said transformer over existing ductwork and bus-bars.

2. A current transformer, as claimed in claim 1, including respective insulating sleeves interposed between each winding section and the associated core leg, said winding sections being wound on the associated insulating sleeves.

3. A current transformer, as claimed in claim 1, in which said winding sections are connected in series with each other; said output terminals being mounted in externally accessible relation, on a third bracket and including two terminals, each connected to a respective end of the secondary winding constituted by the series-connected winding sections, and an intermediate terminal connected to a tap on said secondary winding.

4. A current transformer as claimed in claim 3, in which said respective secondary winding sections are wound on the two core legs extending, in spaced parallel relation to each other, from said two readily removable brackets; said third bracket, carrying said output terminals, being located at that end of one of said two parallel legs carrying said secondary winding sections remote from said two readily removable brackets; the leads from the secondary winding section on the other of said two parallel legs being carried through a fourth corner bracket and a tube enclosing the fourth core leg which is opposite and parallel to said readily removable core leg.

5. A current transformer as claimed in claim 1, in which said corner brackets are two-part moldings of plastic composition material.

6. A current transformer as claimed in claim 5, in which said corner brackets are molded of glass-filled polyester resin.

7. A current transformer as claimed in claim 1, in which each leg of said core comprises a plurality of relatively elongated iron laminations; the laminations of each core leg being interleaved with the laminations of an adjacent core leg at each corner of said core.

* * * * *